United States Patent
Araie et al.

(10) Patent No.: US 10,239,263 B2
(45) Date of Patent: Mar. 26, 2019

(54) THREE DIMENSIONAL PRINTER

(71) Applicant: Sodick Co., Ltd., Kanagawa (JP)

(72) Inventors: Ichiro Araie, Kanagawa (JP); Seishi Kobayashi, Kanagawa (JP); Yoshitaka Kato, Kanagawa (JP); Yasuyuki Miyashita, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 244 days.

(21) Appl. No.: 14/856,864

(22) Filed: Sep. 17, 2015

(65) Prior Publication Data

US 2016/0096325 A1 Apr. 7, 2016

(30) Foreign Application Priority Data

Oct. 6, 2014 (JP) ................. 2014-205834

(51) Int. Cl.
| | |
|---|---|
| B29C 67/00 | (2017.01) |
| B33Y 10/00 | (2015.01) |
| B33Y 30/00 | (2015.01) |
| B33Y 50/02 | (2015.01) |
| B29C 64/153 | (2017.01) |
| B29C 64/386 | (2017.01) |

(52) U.S. Cl.
CPC ........ *B29C 67/0077* (2013.01); *B29C 64/153* (2017.08); *B29C 64/386* (2017.08); *B33Y 10/00* (2014.12); *B33Y 30/00* (2014.12); *B33Y 50/02* (2014.12)

(58) Field of Classification Search
CPC .... B33Y 10/00; B22F 3/1055; B29C 67/0077
USPC ....................................................... 264/497
See application file for complete search history.

(56) References Cited

U.S. PATENT DOCUMENTS

| | | | |
|---|---|---|---|
| 2003/0028278 A1 | 2/2003 | Darrah et al. | |
| 2010/0007062 A1 | 1/2010 | Larsson et al. | |
| 2012/0211926 A1 | 8/2012 | Larsson et al. | |
| 2015/0183165 A1* | 7/2015 | Abe | B29C 35/0805 |
| | | | 264/497 |

FOREIGN PATENT DOCUMENTS

| | | |
|---|---|---|
| CN | 101479064 A | 7/2009 |
| DE | 10042132 A1 | 3/2002 |
| DE | 10042134 A1 | 3/2002 |

(Continued)

OTHER PUBLICATIONS

Chinese Office Action dated Feb. 27, 2017, in connection with corresponding CN Application No. 201510646080.2 (18 pgs., including English translation).

(Continued)

*Primary Examiner* — Weiping Zhu
(74) *Attorney, Agent, or Firm* — Maier & Maier, PLLC

(57) ABSTRACT

A powder sintering lamination molding method which can improve the quality of the molded product without extending the time required for the lamination molding. A powder sintering lamination molding method, including the steps of, irradiating an irradiation region of the sliced layer of a molded product surrounded by an outline profile with a laser to selectively sinter the material powder of the material powder layer within the irradiation region; wherein a cooling period is provided after the laser is irradiated along the first line and before the laser is irradiated along the second line.

7 Claims, 14 Drawing Sheets

(56) References Cited

FOREIGN PATENT DOCUMENTS

| | | |
|---|---|---|
| DE | 10231136 A1 | 2/2003 |
| DE | 10 2006 059 851 A1 | 7/2008 |
| DE | 102006059851 A1 | 7/2008 |
| JP | 2002-166481 A | 6/2002 |
| JP | 2003-127238 A | 5/2003 |
| JP | 2004-2894025 A | 10/2004 |
| JP | 2009-544501 A | 12/2009 |
| JP | 5250338 B2 | 3/2010 |
| JP | 2010-173123 A | 8/2010 |
| WO | 2014010144 A | 1/2014 |
| WO | WO 2015010144 A1 * | 1/2015 ............. A61K 36/40 |

OTHER PUBLICATIONS

Japanese Decision to Grant a Patent dated Feb. 16, 2016, in connection with corresponding JP Application No. 2014-205834 (6 pgs., including English translation).

Japanese Notification of Reasons for Refusal (Japanese Office Action) dated Oct. 6, 2015, in connection with corresponding JP Application No. 2014-205834 (4 pgs., including English translation).

Japanese Notification of Reasons for Refusal (Japanese Office Action) dated Jun. 9, 2015, in connection with corresponding JP Application No. 2014-205834 (6 pgs., including English translation).

Japanese Office Action from corresponding Japanese Application No. 2014-205834 dated Jun. 9, 2015; 7 pgs.

German Office Action dated Oct. 27, 2017, in connection with corresponding German Application No. 102015116886.3 (9 pgs., including English translation).

* cited by examiner

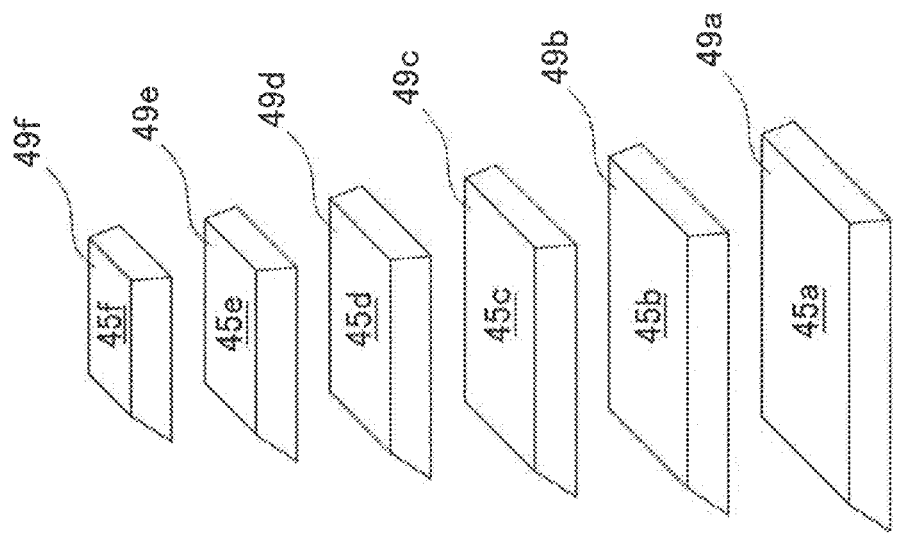
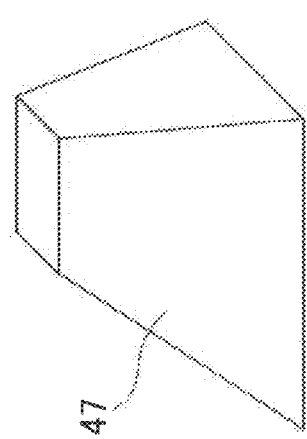
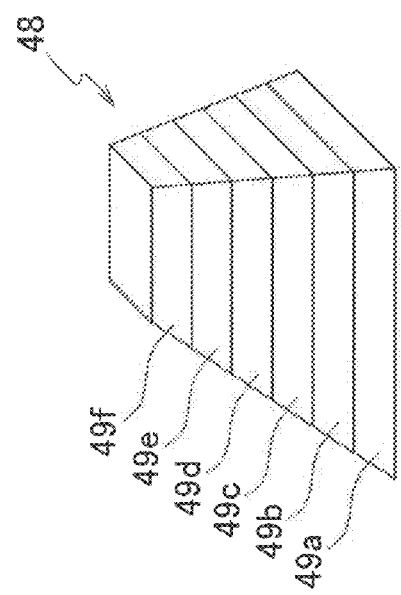

Second embodiment

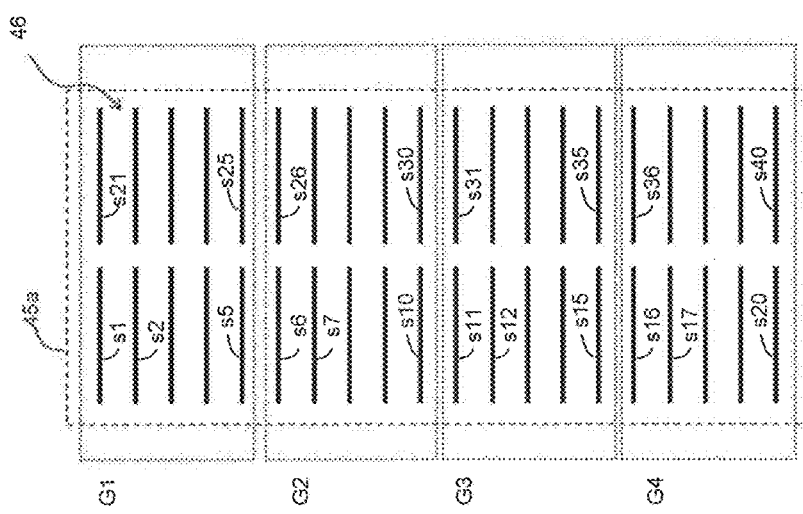
Fig. 11 Third embodiment

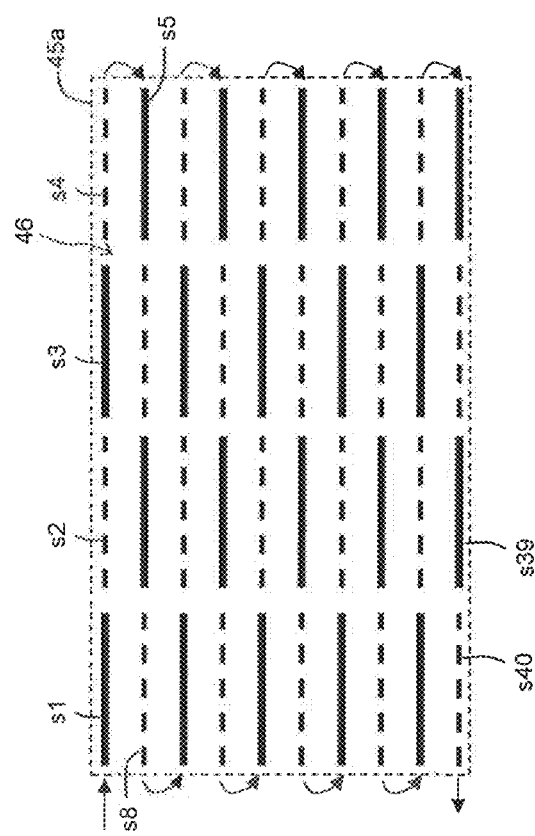

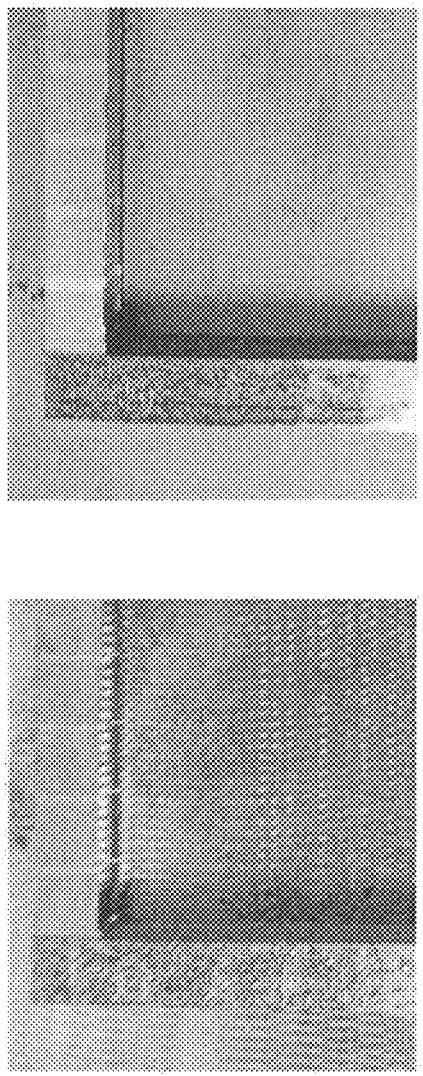

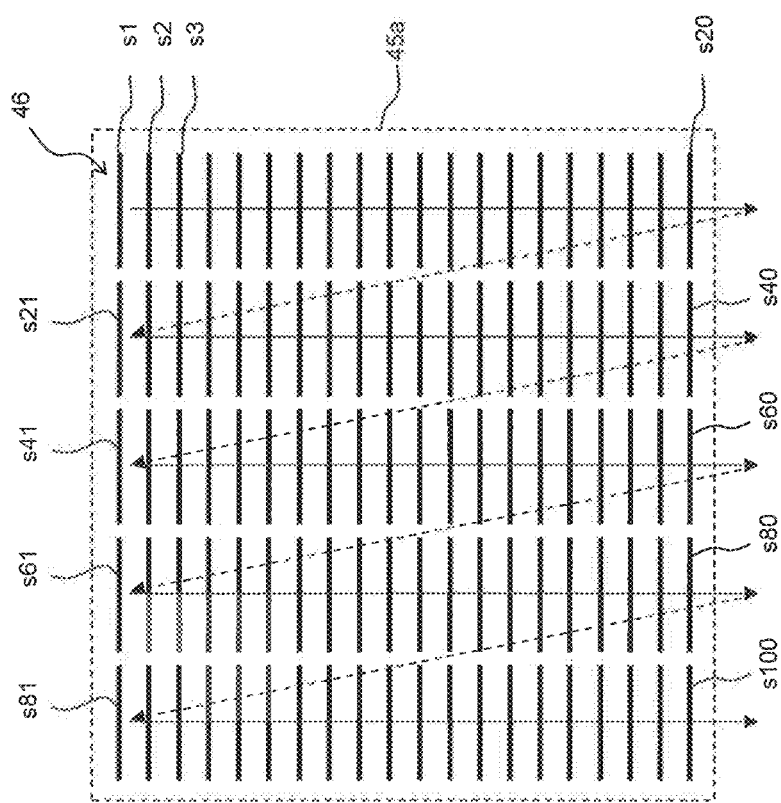

THREE DIMENSIONAL PRINTER

BACKGROUND OF THE INVENTION

Field of the Invention

The present invention relates to a lamination molding apparatus.

Background of the Invention

When a lamination molding of metal is conducted using laser, an extremely thin material powder layer is formed on a molding table configured so as to be capable of moving in a vertical direction, and then a predetermined portion of the material powder layer is irradiated with a laser, thereby sintering the material powder at the position of irradiation. These procedures are repeated to form a desired molded product.

The laser is scanned along a scanning passage provided so that the region to be irradiated with the laser would be irradiated with the laser entirely. Accordingly, the material powder layer is irradiated with the laser (For example, refer to Patent Literature 1).

PRIOR ART DOCUMENTS

Patent Literature

[Patent Literature 1] JP 2010-173123A

SUMMARY OF INVENTION

Technical Problem

Here, the scanning passage 46 of the laser applied to the material powder layer is, for example as shown in FIG. 14, provided so that the entirety of the irradiation region 45a is irradiated with the laser. In the example of FIG. 14, the scanning passage 46 is constituted with a plurality of lines s1, s2, s3, . . . , s100 which are arranged as a matrix. The laser is scanned along each of the lines, for example from left to right, in the order of s1, s2, s3, . . . , s100.

The material powder layer is irradiated with the laser scanned from the left end to the right end of each of the lines, and thus the material powder layer is sintered in lines. In the example of FIG. 14, the laser is turned off during the transition from the right end of one line to the left end of the next line. Therefore, the material powder layer is not irradiated with the laser is such region.

In an attempt to shorten the time required for the lamination molding, the inventors of the present invention have investigated the irradiation conditions of the laser and tried to shorten the time period after irradiation is performed with the laser along the first line and before starting of the irradiation along the second line adjacent to the first line, when the material powder layer is being irradiated with the laser along the scanning passage 46. However, when such time is shortened too far, the heat from the sintered portion along the first line resulted in over-heating of the material powder layer along the second line. Accordingly, problems such as bulge of the material, occurrence of spatter, generation of fume by the sublimation of the material, and change in composition were observed.

In order to prevent such problems, the inventors of the present invention considered that it is important to adequately set the cooling period after irradiation is performed with the laser along the first line and before starting of the irradiation along the second line adjacent to the first line. Accordingly, when the cooling period was set to five times the length of the irradiation period with the laser along each of the lines, the afore-mentioned problems were solved, and manufacture of high quality molded products was achieved.

However, extension of the cooling period caused a new problem that the time required for the lamination molding would be extended.

The present invention has been made by taking these circumstances into consideration. An object of the present invention is to provide a powder sintering lamination molding method which can improve the quality of the molded product without extending the time required for the lamination molding.

Means to Solve the Problem

According to the present invention, a powder sintering lamination molding method, comprising the steps of: forming a material powder layer corresponding to a sliced layer obtained by slicing a model of a molded product having a desired three-dimensional profile, the model being sliced by a horizontal plane at a predetermined unit height; and irradiating an irradiation region of the sliced layer of the molded product surrounded by an outline profile with a laser beam to selectively sinter the material powder of the material powder layer within the irradiation region; wherein the steps of the forming of the material powder layer and the irradiating of the irradiation region are repeated to produce the molded product; the laser beam is scanned along a scanning passage, thereby irradiating the material powder layer, the scanning passage being provided so as to allow irradiation of the laser beam throughout the entire irradiation region; the scanning passage is constituted by a plurality of lines; the plurality of lines are classified into a plurality of line groups; each line group of the plurality of line groups contains a plurality of lines arranged adjacent with each other and a plurality of lines arranged along a direction of the scanning passage; the plurality of lines arranged adjacent with each other contains a first line and a second line; a cooling period is provided after the laser beam is irradiated along the first line and before the laser beam is irradiated along the second line adjacent to the first line; irradiation of the laser beam is controlled so as to irradiate the laser beam along a line belonging to a line group other than a line group in which the first line and the second line belongs, during the cooling period; and the plurality of line groups are selected in order and the laser beam is irradiated along one line belonging to the selected line group, when the laser beam is irradiated, is provided.

Effect of the Invention

In the present invention, by performing irradiation along another line provided apart from the first line during the cooling period, the cooling period being a time period after irradiation is performed with the laser along the first line and before performing the irradiation along the second line adjacent to the first line, the cooling period can be adequately maintained while shortening the time required for the lamination molding.

Hereinafter, various embodiments of the present invention will be provided. The embodiments provided below can be combined with each other.

Preferably, the second line is a line closest to the first line in a direction orthogonal with respect to the scanning direction.

Preferably, the cooling period is 1.5 to 10 times long of an irradiation period of the laser beam along the first line.

Preferably, a number of lines irradiated with the laser beam during the cooling period is 1 to 9.

Preferably, the plurality of line groups are arranged in a different region of one irradiation region.

Preferably, the irradiation region is structured with a plurality of sub-irradiation regions arranged apart from each other; and the plurality of line groups are arranged in a sub-irradiation region different from each other.

Preferably, irradiation of the laser beam is controlled in accordance with the cooling period so that excess heat would not be applied to the adjacent line and so that fusion with the adjacent line would not be insufficient; successive irradiation of the laser beam along the first lines in each of the line groups from one line group to another line group, followed by successive irradiation of the laser beam along the second lines in each of the line groups from one line group to another line group, is achieved by irradiating the first line in a predetermined line group with the laser beam, and then irradiating the second line in a predetermined line group with the laser beam after the cooling period; and irradiation of the laser beam is controlled so that the laser beam is irradiated along a line or a plurality of lines apart from the first line, until irradiation of the laser beam is performed for all of the lines in the Irradiation region.

Further, according to another aspect of the present invention, a computer-assisted manufacturing system which generates a controlling data to control the irradiation of the laser beam in the afore-mentioned powder sintering lamination molding method, is provided.

BRIEF DESCRIPTION OF THE DRAWINGS

The above further objects, features and advantages of the present invention will become more apparent from the following detailed description taken in conjunction with the accompanying drawings, wherein:

FIG. 5A is a perspective view showing the molded product 47 having the desired profile.

FIG. 5B is a perspective view showing the model of the molded product of FIG. 5A.

FIG. 5C is a perspective view showing the model of FIG. 5B sliced by a horizontal plane at a predetermined unit height.

FIG. 8 shows a scanning passage 46 provided in the entirety of the irradiation region 45a.

FIG. 11 shows a scanning passage 46 provided in the entirety of the irradiation region 45a of the third embodiment of the present invention.

FIG. 12 shows a scanning passage 46 provided in the entirety of the irradiation region 45a of the fourth embodiment of the present invention.

FIG. 13A is a picture of the molded product prepared by the conditions of the Example.

FIG. 13B is a picture of the molded product prepared by the conditions of the Comparative Example.

FIG. 14 shows an example of the scanning passage 46 provided in the irradiation region 45a.

DESCRIPTION OF THE PREFERRED EMBODIMENTS

Hereinafter, the embodiments of the present invention will be described with reference to the drawings. Here, the characteristic matters shown in the embodiments can be combined with each other.

1. First Embodiment

Figure 1:
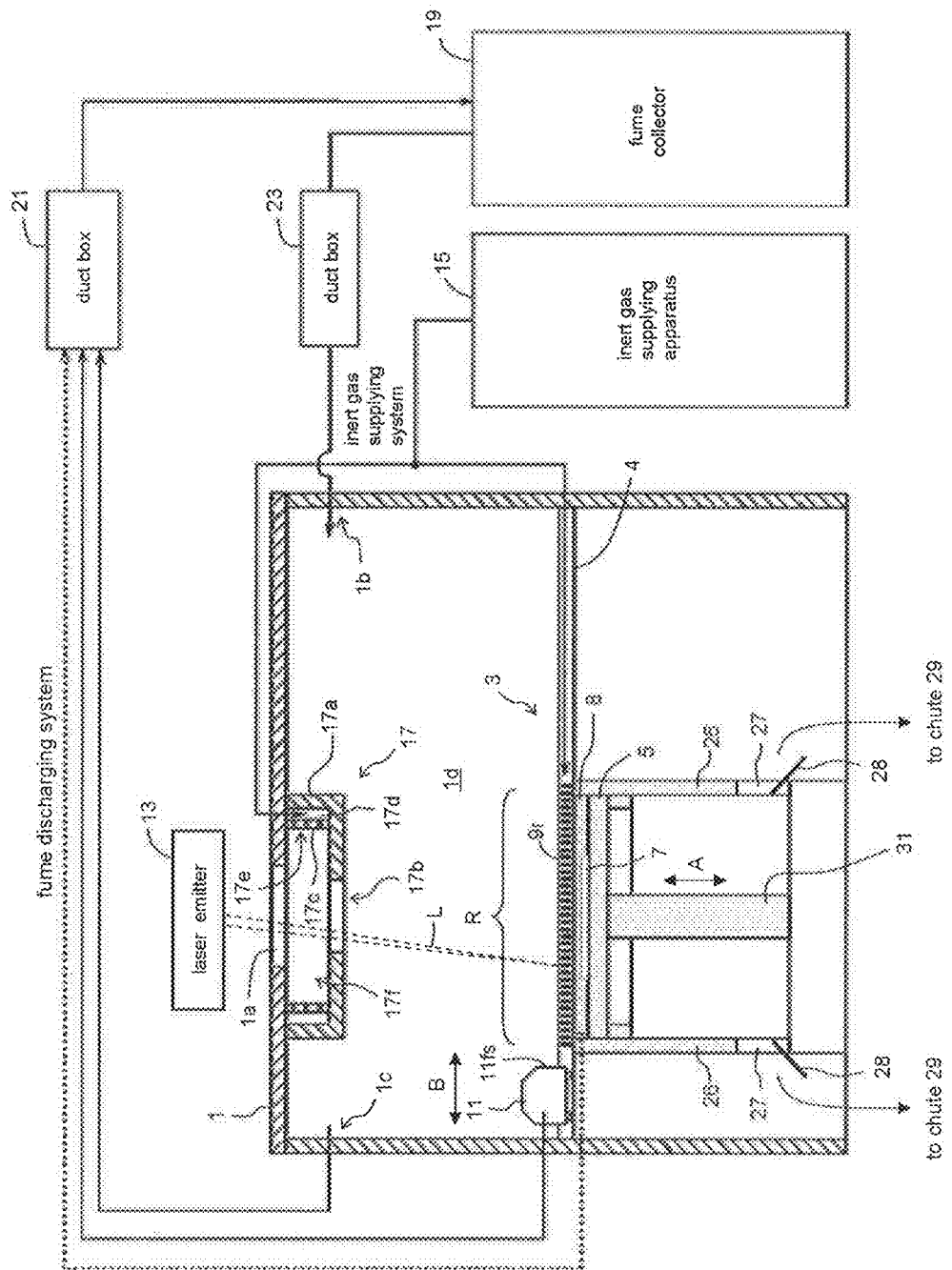
FIG. 1 is a rough structural diagram of the lamination molding apparatus according to the first embodiment of the present invention.
Figure 2:
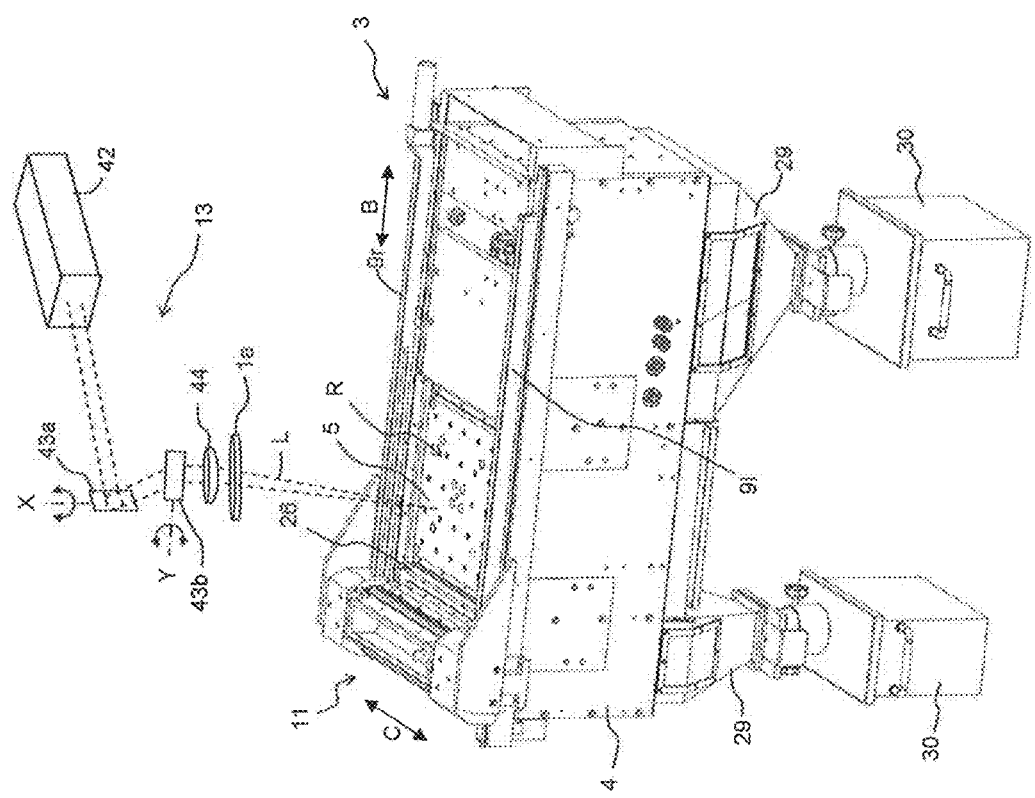
FIG. 2 is a perspective view of the powder layer forming apparatus 3 and the laser emitter 13.

As shown in FIGS. 1 to 2, the lamination molding apparatus according to the first embodiment of the present invention comprises a chamber 1 covering the desired molding region R and being filled with an inert gas having a desired concentration; and a laser emitter 13 to allow the desired portions of the material powder layer 8 formed on the molding region R to be irradiated with the laser, thereby sintering the material powder at the irradiation position.

Inside the chamber 1, a powder layer forming apparatus 3 is provided. The powder layer forming apparatus 3 comprises a base stage 4 having the molding region R; a recoater head 11 provided on the base stage 4 and structured so as to be capable of moving in a horizontal uniaxial direction (direction shown by arrow B); and elongated members 9r, 9l provided on both sides of the molding region R along the moving direction of the recoater head 11. The molding region R is farther provided with a molding table 5 capable of moving in a vertical direction (direction shown by arrow A in FIG. 1). Here, the molding table 5 is driven by a driving mechanism 31. When the lamination molding apparatus is used, a molding plate 7 is placed on the molding table 5, and the material powder layer 8 is formed on the molding table 5.

Powder retaining wall 26 is provided so as to surround the molding table 5, and the non-sintered material powder is retained in the powder retaining space surrounded by the powder retaining wall 26 and the molding table 5. In the lower side of the powder retaining wall 26, a powder ejecting section 27 capable of discharging the material powder in the powder retaining space is provided. After completion of the lamination molding, the molding table 5 is descended so as to discharge the non-sintered material powder from the powder ejecting section 27. The material powder discharged is guided to the chute 29 by the chute guide 28, and then the material powder is retained in the bucket 30 via the chute 29.

Figure 3:
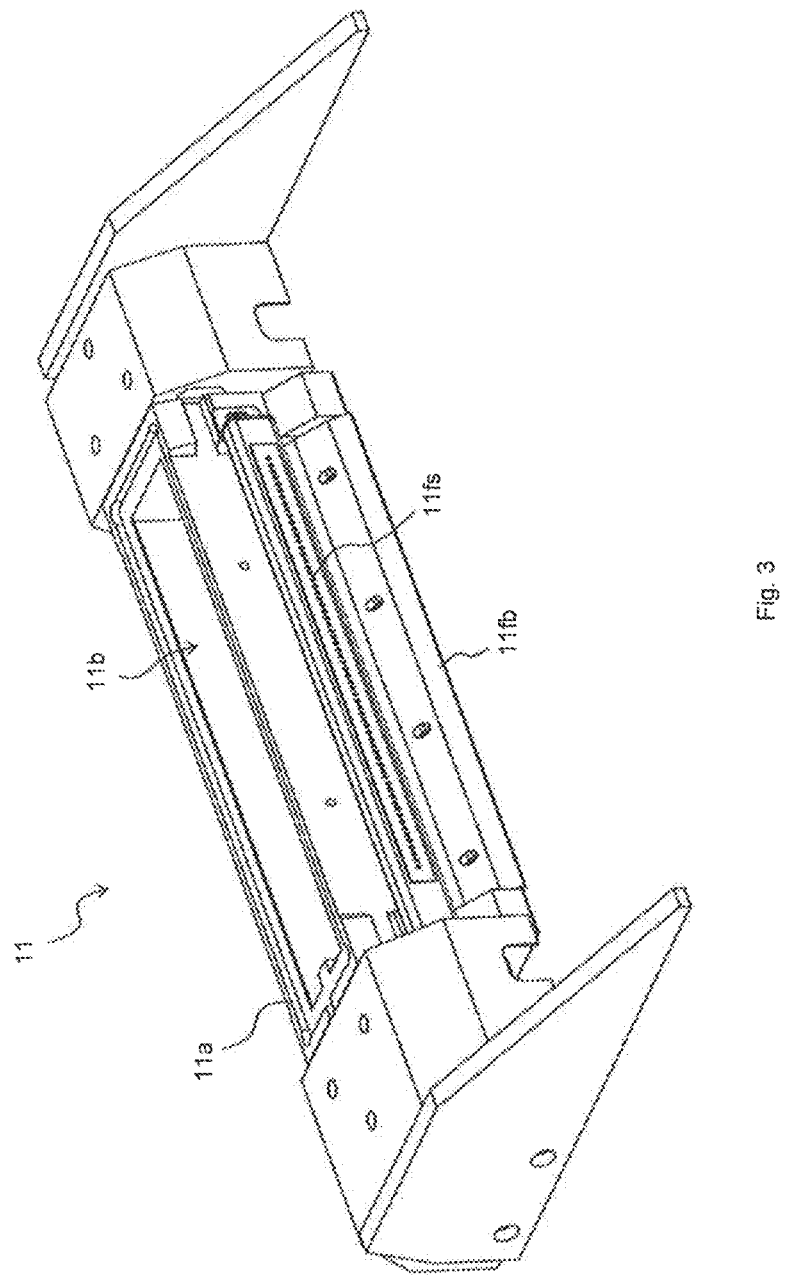
FIG. 3 is a perspective view of the recoater head 11.
Figure 4:
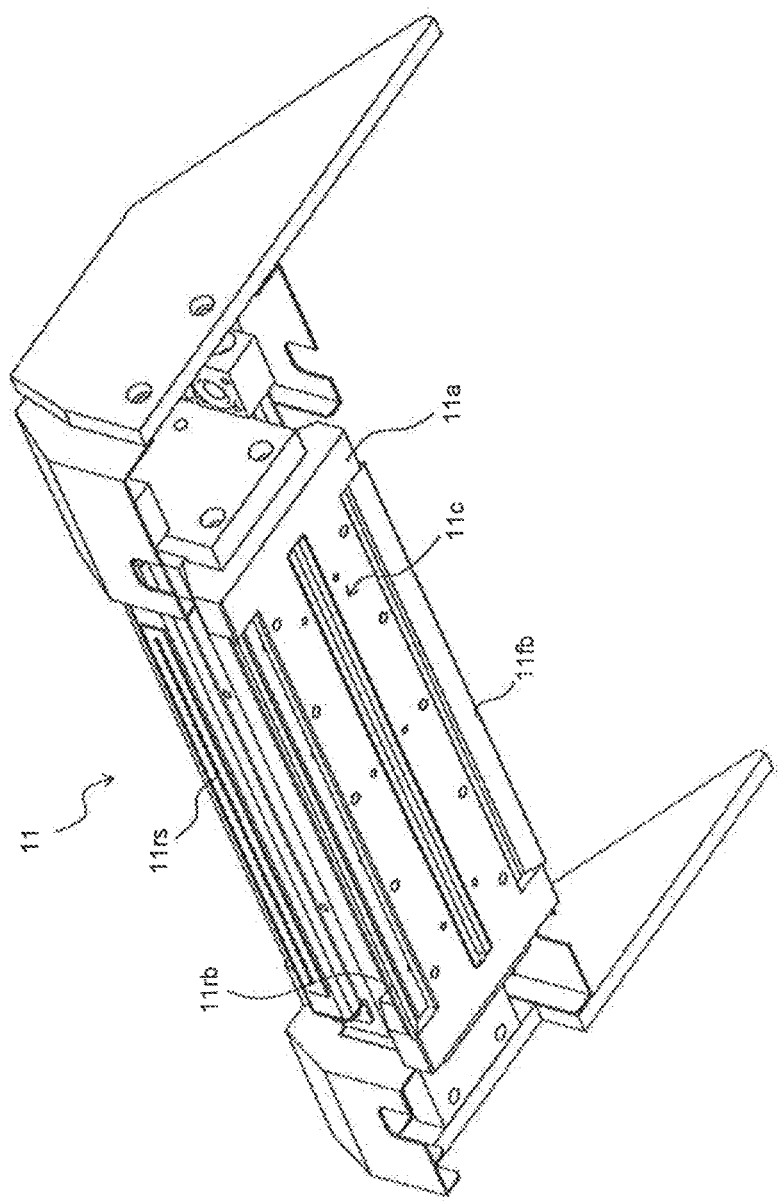
FIG. 4 is a perspective view of the recoater head 11 observed from another angle.
Figure 6:
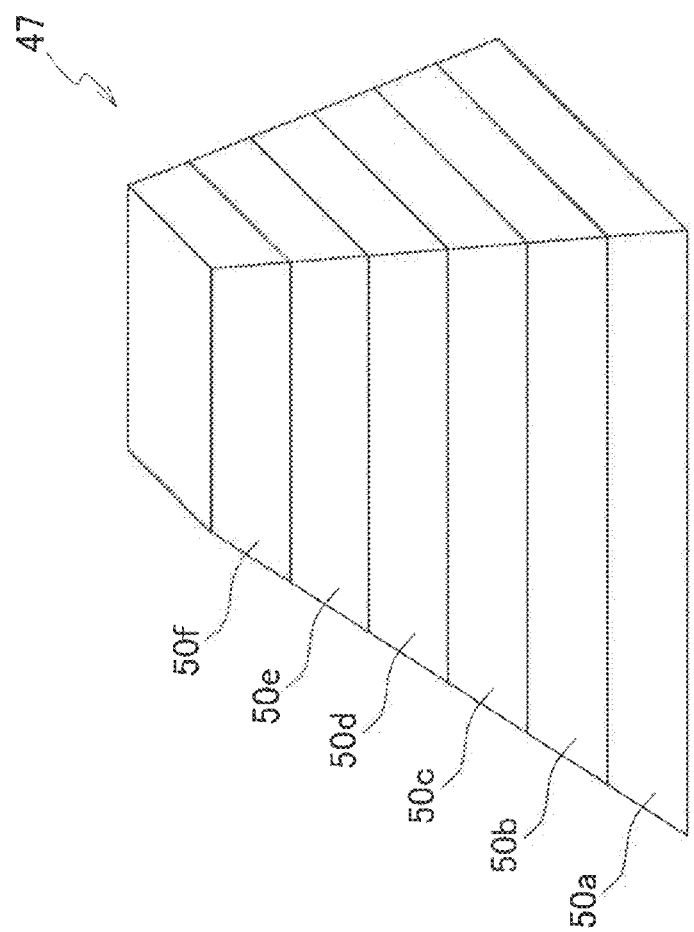
FIG. 6 is a perspective view showing the molded product 47 obtained by laminating the sintered layers 50.

As shown in FIGS. 2 to 4, the recoater head 11 comprises a material holding section 11a, a material supplying section 11b provided at the upper surface of the material holding section 11a, and a material discharging section 11c provided at the bottom surface of the material holding section 11a, the material discharging section 11c discharging the material powder in the material holding section 11a. The material discharging section 11c has a slit shape which elongates in the horizontal uniaxial direction (direction shown by arrow C) crossing orthogonally with the moving direction (direction shown by arrow E) of the recoater head 11. On both sides of the recoater head 11, squeegee blades 11fb and 11rb for forming a material powder layer 8 by planarizing the material powder discharged from the material discharging section 11c are provided. In addition, on both sides of the recoater head 11, fume suction sections 11fs and 11rs for suctioning the fume generated during sintering of the material powder are provided. The fume suction sections 11fs and 11rs are provided along the horizontal uniaxial direction (direction shown by arrow C) crossing orthogonally with the moving direction (direction shown by arrow B) of the recoater head 11. The material powder is, for example, metal powder (iron powder for example) having a sphere shape with an average particle diameter of 20 μm.

The elongated members 9r and 9l are provided with openings along the moving direction (direction shown by arrow B) of the recoater head 11. One of the openings is used as the inert gas supplying opening, and the other opening is used as the inert gas discharging opening. Accordingly, a flow of inert gas can be made in the direction shown by the arrow C on the molding region R. Therefore, the fume generated in the molding region k can be easily discharged along this flow of the inert gas. Here, in the present specification, "inert gas" is a gas which substantially does not react with the material powder, and nitrogen gas, argon gas, and helium gas can be mentioned for example.

A laser emitter 13 is provided above the chamber 1. As shown in FIG. 2, the laser emitter 13 comprises a laser source 42 to emit the laser, a pair of galvanometer scanners 43a and 43b to perform two dimensional scanning of the laser emitted from the laser source 42, and a condensing lens 44 to condense the laser. The galvanometer scanner (X-axis scanner) 43a scans the laser in the direction shown by arrow B (X-axis direction), and the galvanometer scanner (Y-axis scanner) 43b scans the laser in the direction shown by arrow C (Y-axis direction). Each of the scanners 43a and 43b is controlled of its rotation angle depending on the size of the rotation angle controlling signal. Accordingly, the position irradiated by the laser can be moved to a desired position by altering the size of the rotation angle controlling signal being input to the scanners 43a and 43b. An example of the condensing lens 44 is fθ lens.

The laser which passed through the condensing lens 44 further passes through the window 1a provided to the chamber 1. Then, the material powder layer 8 formed in the molding region R is irradiated with the laser. The type of the laser is not limited so long as it can sinter the material powder. For example, $CO_2$ laser, fiber laser, YAG laser and the like can be used. The window 1a is formed with a material capable of transmitting the laser. For example, in a case where the laser is fiber laser or YAG laser, the window 1a can be structured with a quartz glass.

On the upper surface of the chamber 1, the fume adhesion preventing section 17 is provided so as to cover the window 1a. The fume adhesion preventing section 17 is provided with a cylindrical housing 17a and a cylindrical diffusing member 17c arranged in the housing 17a. An inert gas supplying space 17d is provided in between the housing 17a and the diffusing member 17c. Further, on the bottom surface of the housing 17a, an opening 17b is provided at the inner portion of the diffusing member 17c. The diffusing member 17c is provided with a plurality of pores 17e, and the clean inert gas supplied into the inert gas supplying space 17d is filled into a clean space 17f through the pores 17e. Then, the clean inert gas filled in the clean space 17f is discharged towards below the fume adhesion preventing section 17 through the opening 17b.

Next, the inert gas supplying system to supply the inert gas to the chamber 1 and the fume discharging system to discharge the fume from the chamber 1 are explained.

The inert gas supplying system to supply the inert gas into the chamber 1 is connected with an inert gas supplying apparatus 15 and with a fume collector 19. The inert gas supplying apparatus 15 has a function to supply the inert gas, and is a gas cylinder of an inert gas for example. The fume collector 19 comprises duct boxes 21 and 23 provided at its upper stream side and its lower stream side, respectively. The gas (inert gas containing fume) discharged from the chamber 1 is sent to the fume collector 19 through the duct box 21. Then, fume is removed in the fume collector 19, and the cleaned inert gas is sent to the chamber 1 through the duct box 23. According to such constitution, the inert gas can be recycled.

As shown in FIG. 1, the inert gas supplying system is connected with the upper supplying opening 1b of the chamber 1, the inert gas supplying space 17d of the adhesion preventing section 17, and the elongated member 9r. The inert gas is supplied into the molding space 1d of the chamber 1 through the upper supplying opening 1b. The inert gas supplied into the elongated member 9r is discharged onto the molding region R through the opening.

In the present embodiment, the inert gas from the fume collector 19 is sent to the upper supplying opening 1b, and the inert gas from the inert gas supplying apparatus 15 is supplied to the inert gas supplying space 17d and to the elongated member 9r. Although there is a possibility that the inert gas from the fume collector 19 contains residual fume, the constitution of the present embodiment does not permit the inert gas from the fume collector 19 be supplied into the space which requires especially high cleanliness (clean space 17f and the space at the periphery of the molding region R). Accordingly, the effect of the residual fume can be minimized.

As shown in FIG. 1, the fume discharging system to discharge the fume from the chamber 1 is connected with the upper discharging opening 1c of the chamber 1, the fume suction sections 11fs and 11rs of the recoater head 11, and the elongated member 9l. Since the inert gas containing the fume in the molding space 1d of the chamber 1 is discharged through the upper discharging opening 1c, a flow of inert gas flowing from the upper supplying opening 1b towards the upper discharging opening 1c is formed in the molding space 1d. The fume suction sections 11fs and 11rs of the recoater head 11 can suction the fume generated in the molding region R when the recoater head 11 passes over the molding region R. Here, the inert gas containing the fume is discharged out of the chamber 1 through the opening of the elongated member 9l. The fume discharging system is connected with the fume collector 19 through the duct box 21, and the inert gas after removal of the fume by the fume collector 19 is recycled.

Next, the powder sintering lamination molding method using the afore-mentioned lamination molding apparatus will be explained.

Here, a case where the molded product 47 having the three-dimensional profile as shown in FIG. 5A is formed by lamination molding is taken as an example for the explanation.

First, as shown in FIGS. 5B to 5C, a molded product 47 having the desired three-dimensional profile is molded using a computer, thereby obtaining a model 48 of the molded product. Then the model 48 of the molded product is sliced by a horizontal plane with a predetermined unit height, thereby forming sliced layers of 49a, 49b, . . . 49f. Subsequently, as shown in FIGS. 6 to 9, the material powder layer 8 is irradiated with the laser so as to selectively sinter the material powder, thereby forming the sintered layers of 50a, 50b, . . . 50f having the profile corresponding to the sliced layers of 49a, 49b, . . . 49f respectively. The sintered layers are also fused with each other, thereby forming the molded product 47. The region surrounded by the outline profile of each of the sliced layers of 49a, 49b, . . . 49f is the region to be irradiated with the laser, 45a, 45b, . . . 45f (hereinafter referred to as irradiation region). The sliced layers, sintered layers, and irradiation region are also referred to as sliced layers 49, sintered layers 50, and irradiation region 45a, respectively.

As described, the molded product 47 can be formed by repeating selective sintering of the material powder of the material powder layer 8 in the irradiation region 45a. This is accomplished by irradiating the irradiation region 45a with the laser. Here, the irradiation region 45a is surrounded by the outline profile of each of the sliced layers 49 of the model 48 of the molded product.

Next, the method for forming the sintered layers 50 will be explained in detail.

Figure 7:
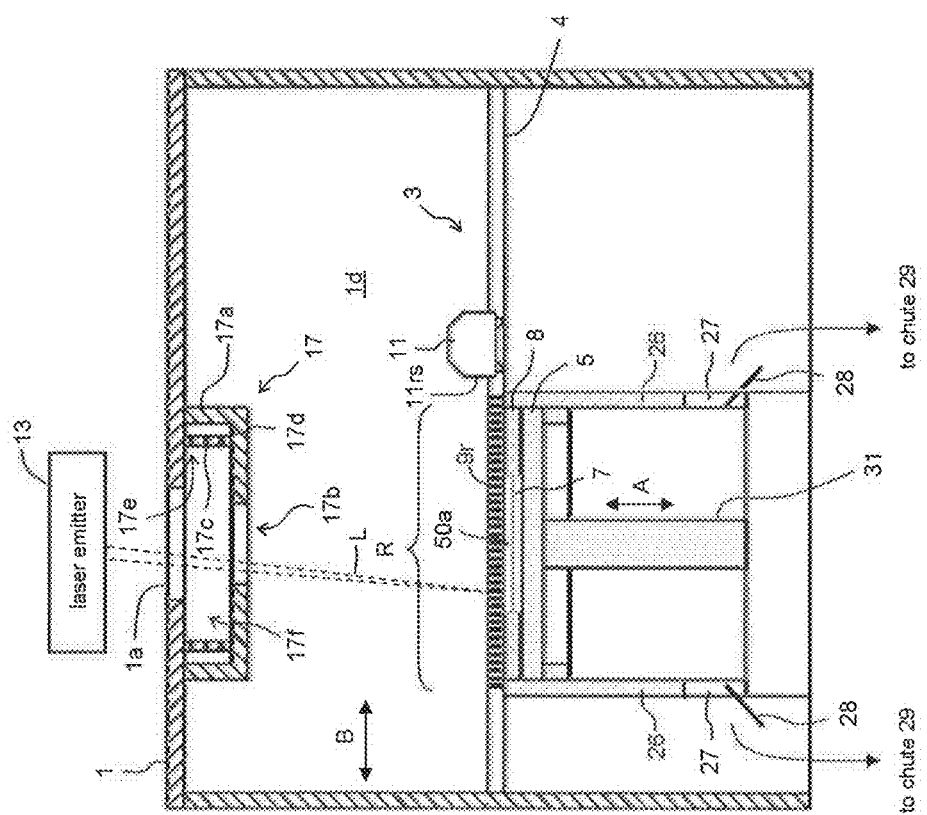
FIG. 7 is an explanatory drawing showing the lamination molding method which uses the lamination molding apparatus according to the first embodiment of the present invention.

First, the height of the molding table 5 is adjusted to an adequate position while the molding plate 7 is mounted on the molding table 5. In such condition, the recoater head 11 having the material holding section 11a filled with the material powder is moved from the left side to the right side of the molding region R in the direction shown by the arrow B in FIG. 1. Accordingly, the first layer of the material powder layer 8 is formed on the molding plate 7. Next, as shown in FIG. 7, the material powder layer 8 is irradiated with the laser to sinter a portion of the material powder layer, thereby obtaining the first sintered layer 50a.

Figure 8:
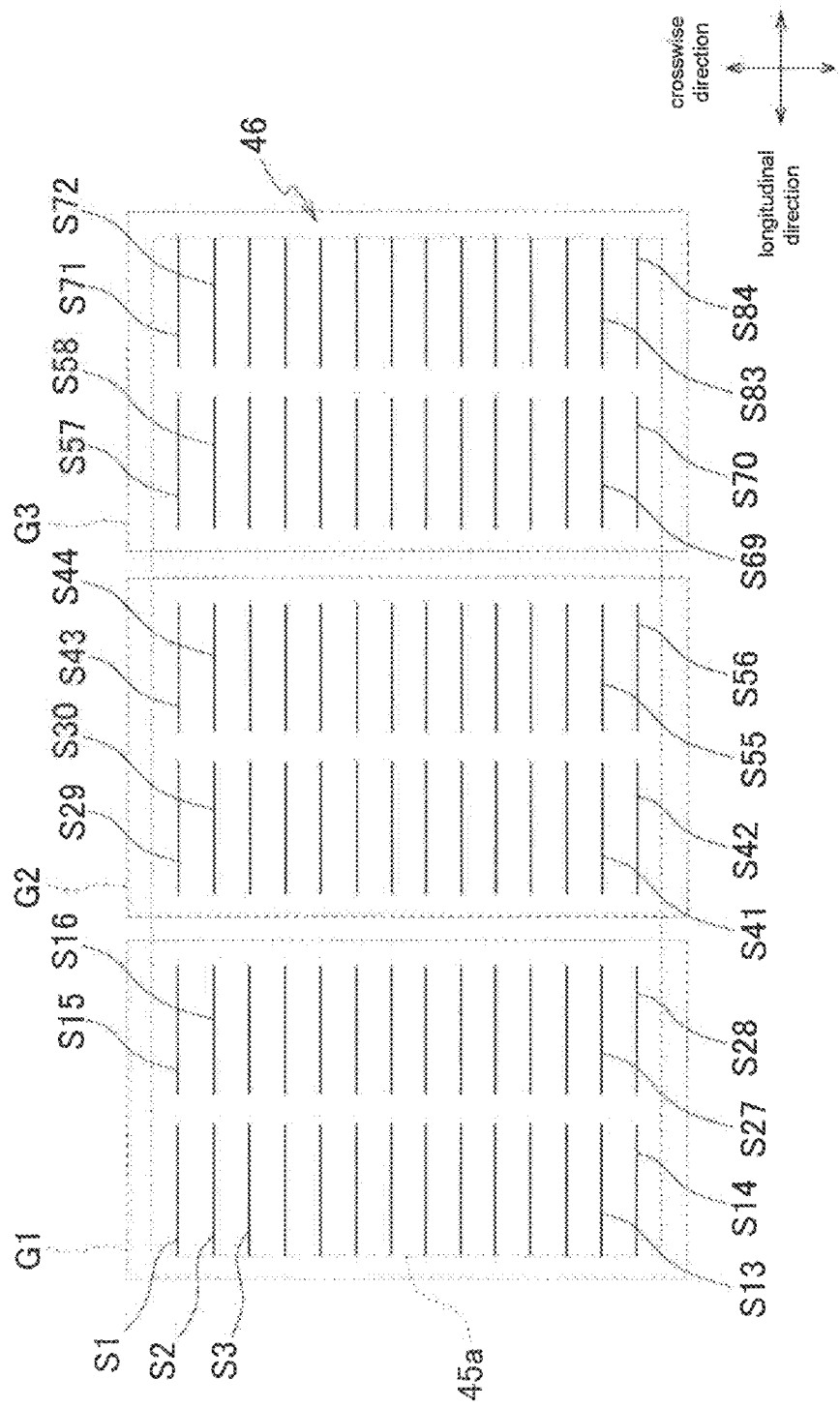

Here, in the conventional technique, irradiation with the laser was performed in the order of the arrangement of the lines. That is, as shown in FIG. 8, irradiation with the laser was performed along the lines arranged parallel to each other in the order of line s1, line s2, line s3. However, when the irradiation of the laser is performed along the second line adjacent to the first line (for example, line s16) immediately after the irradiation of the laser along the first line (for example, line s15), the heat from the sintered portion along the first line would cause over-heating of the material powder layer 8 along the second line. This can cause problems such as bulge of the material, occurrence of spatter, generation of fume by the sublimation of the material, and change in composition.

In order to solve the afore-mentioned problems, irradiation of the laser along the second line is performed when a predetermined cooling period has elapsed after the irradiation of the laser along the first line is performed. Since the portions sintered along the first line is cooled to some extent during this cooling period, the effect of the heat from the sintered portion along the first line is eased, and thus the afore-mentioned problems can be solved. Here, an arbitrary line among the plurality of lines constituting the scanning passage 46 can be selected as the first line, and an arbitrary line among the lines adjacent to the first line can be selected as the second line. As the second line, an arbitrary line among the lines that are affected by the heat from the first line can be selected. Here, it is preferable to choose the closest line in the crosswise direction of the first line (crosswise direction as shown in FIG. 8), since such line is most heavily affected by the heat from the first line. For example, when the first line is line s15, the second line is preferably line s16. Here, the "crosswise direction" corresponds to the "direction orthogonal with respect to the scanning direction" in the Claims.

An appropriate cooling period shall be set in accordance with the laser irradiation conditions such as the output of the laser, scanning speed, spot diameter and the like. For example, the cooling period is preferably 1.5 to 10 times the length of the irradiation period of the laser along the first line, and more preferably 2 to 6 times the length. When the cooling period is too short, the sintered portion along the first line cannot be cooled sufficiently, thereby causing the afore-mentioned problems. Therefore, the cooling period is preferably 1.5 times or longer than the irradiation period of the laser along the first line. On the other hand, when the cooling period is too long, the fusion of the sintered portion along the first line and the sintered portion along the second line would not be sufficient. It is known from experimental experience that this can cause another problem in that an incompletely fused portion would occur in the molded product. Therefore, the irradiation of laser beam is controlled in accordance with the cooling period so that excess heat would not be applied to the adjacent line and so that the fusion with the adjacent line would not be insufficient. Thus, successive irradiation of the laser beam along the first lines in each of the line groups from one line group to another line group, followed by successive irradiation of the laser beam along the second lines in each of the line groups from one line group to another line group, is achieved by irradiating the first line in a predetermined line group with the laser beam, and then irradiating the second line in a predetermined line group with the laser beam after the cooling period. Accordingly, the irradiation of the laser beam is controlled so that the laser beam is irradiated along a line or a plurality of lines apart from the first line, until the irradiation of the laser beam is performed for all of the lines in the irradiation region. Therefore, the cooling period is preferably 10 times or shorter than the irradiation period of the laser along the first line. For example, when the irradiation period of the laser along the first line is 10 msec, the cooling period is preferably 15 msec to 100 msec. The cooling period can be extended as the length of the first line becomes longer. The position of irradiation of the laser can be moved to an arbitrary position swiftly by changing the angle of the galvanometer scanners 43a and 43b, as mentioned above. The number of lines irradiated with the laser during the cooling period shall depend on the length of the cooling period. Here, for example, such number is preferably 1 to 9, and more preferably 2 to 6.

As shown in FIG. 8, in the scanning passage 46 provided in the entirety of the irradiation region 45a to be irradiated with the laser, a plurality of lines s1 to s84 are arranged. Here, the plurality of lines s1 to s84 have the same length and are elongated in the longitudinal direction. The plurality of lines s1 to s84 are arranged so that each of the three line groups of G1 to G3 contains 28 lines. The lines contained in each of the line groups G1 to G3 are arranged in two columns, each of the columns containing 14 lines. More specifically, in line group G1, a column containing lines s1 to s14 is provided in the left side of FIG. 8, and a column containing lines s15 to s28 is provided in the right side of FIG. 8. Here, lines s1 and s15, lines s2 and s16, . . . lines s13 and s27, and lines s14 and s28 are arranged next to each other in the longitudinal direction. In line group G2, a column containing lines s29 to s42 is provided in the left side of FIG. 8, and a column containing lines s43 to s56 is provided in the right side of FIG. 8. Here, lines s29 and s43, lines s30 and s58, . . . lines s41 and s55, and lines s42 and s56 are arranged next to each other in the longitudinal direction.

In line group G3, a column containing lines s57 to s70 is provided in the left side of FIG. 8, and a column containing lines s71 to s84 is provided in the right side of FIG. 8. Here, lines s57 and s71, lines s58 and s72, . . . lines s69 and s83, and lines s70 and s84 are arranged next to each other in the longitudinal direction. In addition, line groups G1 to G3 are aligned in the longitudinal direction. More specifically, the line group G1 and the line group G2 are arranged so that lines s15 and s29, lines s16 and s30, . . . lines s27 and s41, and lines s28 and s42 are arranged next to each other in the longitudinal direction. Further, the line group G2 and the line group G3 are arranged so that lines s43 and s57, lines s44 and s58, . . . lines s55 and s83, and lines s56 and s70 are arranged next to each other in the longitudinal direction. Here, the number of the line groups can be selected arbitrarily.

Here, the line group is selected among G1 to G3 in order, and the laser is irradiated along one line belonging to the selected line group. First, regarding the columns in the line groups G1 to G3 provided at the left side of FIG. 8, line s1, line s29, line s57, line s2, line s30, line s58, . . . line s13, line s41, line s69, line s14, line s42, and line s70 are irradiated with the laser in this order. Then, regarding the columns in the line groups G1 to G3 provided at the right side of FIG. 8, line s15, line s43, line s71, line s16, line s44, line s72, . . . line s27, line s55, line s83, line s28, line s56, and line s84 are irradiated with the laser in this order. That is, after irradiating one line with the laser, the next line selected for irradiation with the laser is apart from the one line by the length of lines s1 to s84 or longer in the longitudinal direction. Here, the irradiation speed is held constant in order to avoid irradiation mottles.

Figure 9:
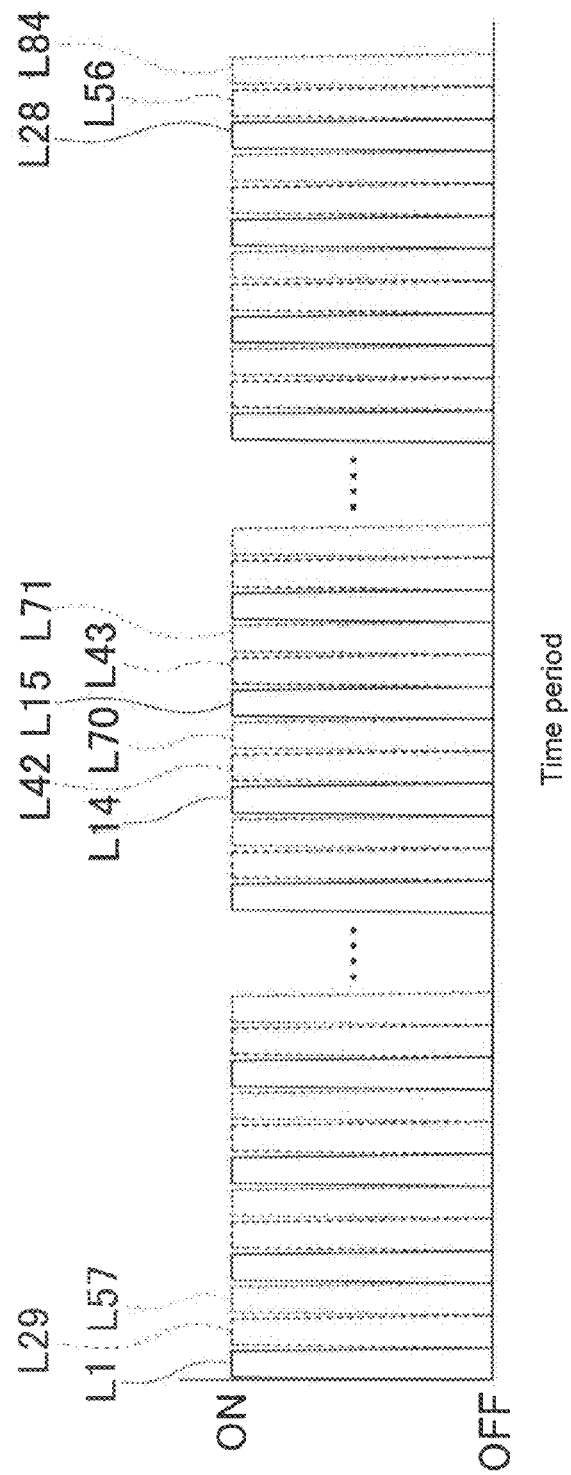
FIG. 9 is a graph showing a timing to perform laser irradiation to lines s1 to s84.

FIG. 9 is a graph showing the timing for controlling the ON/OFF of the laser irradiated to lines s1 to s84. The solid line, the broken line, and the dashed line show the timing of the laser irradiation performed to the line contained in the line group G1, line group G2, and line group G3, respectively. The graph of FIG. 9 shows how the laser irradiation is performed in the afore-mentioned order with respect to the column at the left side of the line groups G1 to G3, that is, the laser irradiation L1 is performed for line s1, the laser irradiation L29 is performed for line s29, the laser irradiation L57 is performed for line s57, . . . the laser irradiation L14 is performed for line s14, the laser irradiation L42 is performed for line s42, and the laser Irradiation L70 is performed for line s70. Then, with respect to the column at the right side of the line groups G1 to G3, the laser irradiation L15 is performed for line s15, the laser irradiation L43 is performed for line s43, the laser irradiation L72 is performed for line s72 . . . the laser irradiation L28 is performed for line s28, the laser irradiation L56 is performed for line s56, and the laser irradiation L84 is performed for line s84, thereby sintering one powder layer.

In the present embodiment, after irradiating one line with the laser, a plurality of lines arranged apart by the length of lines s1 to s84 or longer in the longitudinal direction are irradiated with the laser during the cooling period until the adjacent lines in the crosswise direction are sintered.

In addition, lines s1 to s84 have the same length, and the irradiation speed of the laser is constant. Therefore, as shown in FIG. 9, compensation for the difference in the cooling period derived from the difference in the total length of the lines irradiated after irradiation of the first line and before irradiation of the second line can be made without providing a standby-time in which laser irradiation is not performed, and another line can be irradiated with the laser. Accordingly, all of the lines arranged in the irradiation region of each of the layers can be irradiated with the laser without time loss. Therefore, the time required for sintering one layer can be suppressed to minimum.

Here, the irradiation with the laser can be controlled in accordance with a control data generated by a program installed in the lamination molding apparatus, or can be controlled in accordance with a control data generated by allowing a separately provided computer aided manufacturing (CAM) system to execute a program which generates a control data for controlling the irradiation of the laser. Here, the control data is, for example, a data which associates the position of irradiation of the laser with the ON/OFF of the laser source 42. The lamination molding apparatus controls the angle of the galvanometer scanners 43a and 43b in association with the ON/OFF control of the laser source 42 in accordance with such control data, thereby controlling the irradiation position of the laser. Accordingly, the powder sintering lamination molding method of the present embodiment can be performed.

Next, the height of the molding table 5 is descended by the thickness of one layer of the material powder layer 8, followed by moving of the recoater head 11 from the right side to the left side of the molding region R. Accordingly, the second material powder layer 8 is formed on the sintered layer 50a.

Subsequently, in a similar manner as described, the prescribed portion of the material powder layer 8 is irradiated with the laser beam L, thereby sintering the portion of the material powder layer 8 irradiated with the laser beam. Accordingly, the second sintered layer 50b is obtained.

By repeating the afore-mentioned procedures, the third sintered layer 50c, the fourth sintered layer 50d, and the sintered layers thereafter are formed. The neighboring sintered layers are firmly fixed with each other.

After completion of the lamination molding, the non-sintered material powders are discharged via the powder discharging section 27, to give the molded product.

1. Second Embodiment

Figure 10:
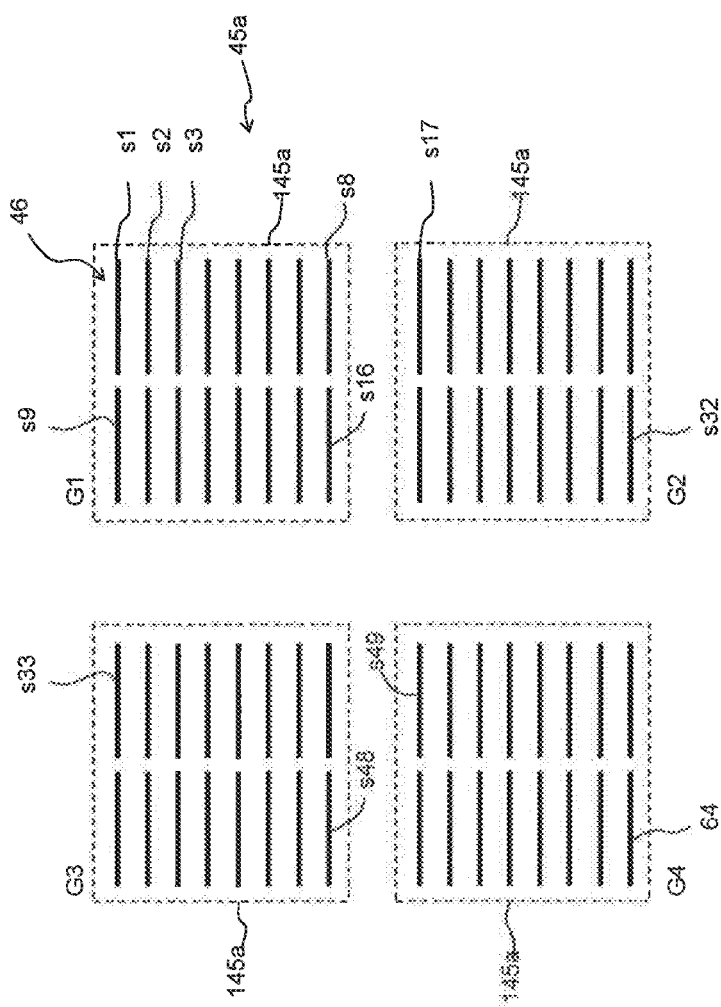
FIG. 10 shows a scanning passage 46 provided in the entirety of the irradiation region 45a of the second embodiment of the present invention.

The second embodiment of the present invention will be described with reference to FIG. 10. The present embodiment is similar to the first embodiment, and is an embodiment where a plurality of molded products are produced by one lamination molding.

When the size of the molded product is small, a plurality of the molded products can be produced by one lamination molding. The plurality of lines s1 to s40 have the same length and are elongated in the longitudinal direction. When the plurality of the molded products are produced in one lamination molding, the irradiation region 45a is, as shown in FIG. 10, constituted with a plurality of sub-irradiation regions 145a arranged apart from each other. Here, the scanning passage 46 is provided to cover the plurality of the sub-irradiation regions 145a.

In addition, the line groups G1 to G4 are arranged in separate sub-irradiation regions 145a, respectively. Each of the line groups contains a plurality of lines that are adjacent to each other. Specifically, line group G1 contains lines s1 to s16, line group G2 contains line s17 to s32, line group G3 contains s33 to s48, and line group G4 contains s49 to s64.

In a similar manner as the first embodiment, the line groups G1 to G4 are selected in order, and the irradiation of the laser is performed along one line belonging to the selected line group. Then, the selected one line is irradiated with the laser. Specifically, the line group is selected in the order of G1, G2, G3, G4, G1, G2, G3, G4, and the one line is selected in accordance with the order of precedence, from the selected line group. Since the line groups G1 to G4 are apart from each other, the affect of the heat from the portion irradiated with the laser can be suppressed. Accordingly, in a similar manner as the first embodiment, the present embodiment can maintain an appropriate cooling period while preventing the molding period from extending.

3. Third Embodiment

The third embodiment of the present invention will be described with reference to FIG. 11. The present embodiment is similar to the first embodiment, and the major difference is the way the line groups are arranged. Hereinafter, such difference will mainly be explained.

In the first embodiment, as shown in FIG. 8, the line group was arranged so that all of the lines in one column belonged to the same line group. In the present embodiment, the line groups are arranged so that the lines belonging to one column are classified and belong to a plurality of separate line groups. Specifically, the lines s1 to s20 belonging to the first column are classified in four, and lines s1 to s5, lines s6 to s10, lines s11 to s15, and lines s16 to s20 belong to line groups G1 to G4, respectively. In addition, similar arrangement is made with the second column, and the lines s21 to s40 are classified in four, and lines s21 to s25, lines s26 to s30, lines s31 to s35, and lines s36 to s40 belong to line groups G1 to G4, respectively.

In a similar manner as the first embodiment, the line groups G1 to G4 are selected in order, and the irradiation of the laser is performed along one line belonging to the selected line group. Specifically, the line group is selected in the order of G1, G2, G3, G4, G1, G2, G3, G4, and the one line is selected in accordance with the order of precedence, from the selected line group. Specifically, the irradiation of the lines s1, s6, s11, s16, s2, s7, s12, s17, . . . is performed with the laser in this order. Since the lines s6, s11, and s16 that are irradiated with the laser during the cooling period are all apart from the line s1, the effect of the heat from the sintered portion along the first line s1 is sufficiently small. Here, the cooling period is a period between performing of the irradiation along line s1 (first line) with the laser and performing of the irradiation along line s2 (second line) with the laser. Accordingly, in a similar manner as the first embodiment, the present embodiment can maintain an appropriate cooling period while preventing the molding period from extending.

4. Fourth Embodiment

The fourth embodiment of the present invention will be described with reference to FIG. 12. The present embodiment is similar to the first embodiment, and the major difference is the order of the irradiation along the line by the laser. Hereinafter, such difference will mainly be explained.

In the present embodiment, the scanning passage 46 provided in the irradiation region 45*a* is constituted with lines s1 to s40. The lines s1 to s40 are, as shown in FIG. 12, arranged from the left to the right in the odd-numbered rows, and are arranged from the right to the left in the even-numbered rows. Then, in the first laser irradiation, the irradiation is performed along the odd-numbered lines shown by the bold lines by the laser, and in the second laser irradiation, the irradiation is performed along the even-numbered lines shown by the dotted lines. By performing the irradiation in such order, sufficient cooling period can be maintained after the irradiation along line s1 (first line) by the laser and before the irradiation along lines s2 and s8 that are adjacent to line s1. In addition, laser can be irradiated along a plurality of lines in the cooling period.

Preferred embodiments of the present invention have been explained. Here, the present invention shall not be limited to the afore-mentioned embodiments nor to the Examples, and various modification can be made so long as they are within the scope of the Claims.

In the first to the fourth embodiment, the lengths of the plurality of lines were the same. Here, the length of the plurality of lines can be different. That is, the shape of each of the layers is not limited. Accordingly, the profile of the product obtained is not limited. In such case, in order to compensate with the difference in the cooling period derived from the difference in the total length of the plurality of lines irradiated after a particular line is irradiated and before a line adjacent to the particular line in the crosswise direction is irradiated, a stand-by time in which the laser irradiation is not performed need be provided as necessary, however, the time required for sintering one layer can be shortened compared with the conventional case where laser irradiation was performed in order from the top (for example, in the order of s1, s2, s3, . . . ) and providing a stand-by time for cooling after each time the laser irradiation is performed for one line.

In addition, in the first to the third embodiment, the number of lines contained in each of the line groups was constant. Here, the number of lines contained in the line groups can differ among the line groups. In such case, for example, in the final stage of the laser sintering of a certain layer, the number of the line to be selected for successive irradiation becomes less. Then, sintering a line adjacent in the longitudinal direction can be considered, however, a stand-by time in which the laser irradiation is not performed can be provided only in such cases. Accordingly, the time required for sintering one layer can be shortened compared with the conventional case where a stand-by time for cooling was provided after each time the laser irradiation was performed for one line.

Examples

A material powder layer having a thickness of 200 to 250 µm was formed using an iron powder having a grain size of 20 µm. The material powder layer was irradiated with the laser to form a sintered layer having a thickness of 50 µm. These processes were repeated to produce the molded product. The conditions for laser irradiation were scanning speed of 1400 mm/s, output of 320 W, and spot diameter of 200 µm. The irradiation passage of the laser was constituted with a plurality of lines arranged as a matrix as shown in FIG. 11. The pitch between the adjacent lines was 120 µm. The irradiation period of the laser for each of the lines were 9 msec. In the Comparative Example, the cooling period provided before the laser irradiation to the adjacent line was 9 msec, and the laser irradiation was not performed to other lines during the cooling period. In the Examples, the cooling period provided before the laser irradiation to the adjacent line was 30 msec, and the laser irradiation was performed along one line belonging to a line group selected in the order of line group G1 to G4, as in the third embodiment.

Accordingly, in the Examples, laser irradiation was performed along three lines during the cooling period. The conditions for the Examples required shorter time for producing the molded product, compared with the conditions for the Comparative Examples.

Rockwell hardness was measured for the molded product obtained with the conditions of the Examples and the Comparative Examples, before and after the aging treatment. Results are shown in Table 1. In addition, enlarged pictures of the upper surface of the molded product are shown in FIGS. 13A to 13B. These results show that the quality of the surface and the hardness are improved in the Examples than the Comparative Examples. In addition, pores, which are referred to as "nest" are less and thus bulk density is higher in the Examples. According to the present invention, molding suitable for metal parts or metal mold can be performed.

TABLE 1

|  | before aging | after aging |
|---|---|---|
| Example | 37.0 | 54.7 |
| Comparative Example | 33.1 | 52.1 |

* HRC

EXPLANATION OF SYMBOLS

1: chamber
3: powder layer forming apparatus
5: molding table
8: material powder layer
11: recoater head
13: laser emitter
17: fume adhesion preventing section
26: powder retaining wall
27: powder discharging section
28: chute guide
29: chute
30: bucket
31: driving mechanism
32: powder retaining space
33: upper wiper
34: dust tray
42: laser source
43a, 43b: galvanometer scanner
44: condensing lens
45a: irradiation region
46: scanning passage
47: molded product
48: model of molded product
49: sliced layer
50: sintered layer
L: laser Although various exemplary embodiments have been shown and described, the invention is not limited to the embodiments shown. Therefore, the scope of the invention is intended to be limited solely by the scope of the claims that follow.

What is claimed is:

1. A powder sintering lamination molding method, comprising the steps of:
    forming a material powder layer corresponding to a sliced layer obtained by slicing a model of a molded product having a desired three-dimensional profile, the model being sliced by a horizontal plane at a unit height; and
    irradiating an irradiation region of the sliced layer of the molded product surrounded by an outline profile with a laser to selectively sinter the material powder of the material powder layer within the irradiation region;
    wherein the steps of the forming of the material powder layer and the irradiating of the irradiation region are repeated to produce the molded product;
    the laser is scanned along a scanning passage comprising a plurality of lines, thereby irradiating the material powder layer, the scanning passage provided to allow irradiation of the laser throughout the entire irradiation region;
    the plurality of lines are classified into a plurality of line groups;
    each line group of the plurality of line groups contains a plurality of lines arranged in a first direction of a width of line and a plurality of lines arranged in a second direction orthogonal to the first direction;
    condition (a): wherein a first line is a line irradiated with the laser among a plurality of lines, and a second line is a line affected by heat of the first line such that each of the plurality of lines is discontinuous from any other line within the entire irradiation region;
    condition (b): a cooling period is provided after the laser is irradiated along the first line and before the laser is irradiated along the second line;
    condition (c): irradiation of the laser is controlled to irradiate the laser, along a line besides the second line and belonging to a line group other than a line group in which the first line and the second line belongs, during the cooling period; and
    condition (d): the plurality of line groups are selected in order and the laser is irradiated along one line belonging to the selected line group, when the laser is irradiated;
    wherein no matter which line among the plurality of lines is selected as the first line, all of the conditions (a) to (d) are satisfied.

2. The method of claim 1, wherein the second line is a line closest to the first line in a direction orthogonal with respect to the scanning direction.

3. The method of claim 1, wherein the cooling period is 1.5 to 10 times long of an irradiation period of the laser along the first line.

4. The method of claim 1, wherein a number of lines irradiated with the laser during the cooling period is 1 to 9.

5. The method of claim 1, wherein the plurality of line groups are arranged in a different region of one irradiation region.

6. The method of claim 1, wherein the irradiation region is structured with a plurality of sub-irradiation regions arranged apart from each other; and the plurality of line groups are arranged in a sub-irradiation region different from each other.

7. The method of claim 1, wherein irradiation of the laser is controlled in accordance with the cooling period so that excess heat would not be applied to the adjacent line and so that fusion with the adjacent line would not be insufficient; successive irradiation of the laser along the first lines in each of the line groups from one line group to another line group, followed by successive irradiation of the laser along the second lines in each of the line groups from one line group to another line group, is achieved by irradiating the first line in a line group with the laser, and then irradiating the second line in a line group with the laser after the cooling period; and the laser is irradiated along a line or a plurality of lines apart from the first line, until irradiation of the laser is performed for all of the lines in the irradiation region.

* * * * *